(12) United States Patent
Schaefer

(10) Patent No.: US 7,723,936 B2
(45) Date of Patent: May 25, 2010

(54) METHOD FOR CONTROLLED BRAKING OF A DOOR AND DEVICE FOR APPLYING SAID METHOD

(75) Inventor: Dirk Schaefer, Weilmuenster (DE)

(73) Assignee: Feig Electronic GmbH (DE)

( * ) Notice: Subject to any disclaimer, the term of this patent is extended or adjusted under 35 U.S.C. 154(b) by 334 days.

(21) Appl. No.: 11/829,355

(22) Filed: Jul. 27, 2007

(65) Prior Publication Data

US 2008/0036409 A1 Feb. 14, 2008

(30) Foreign Application Priority Data

Jul. 28, 2006 (DE) .................. 10 2006 034 962

(51) Int. Cl.
*H02K 7/10* (2006.01)

(52) U.S. Cl. .................. 318/362; 318/364; 318/365; 318/366

(58) Field of Classification Search .......... 318/362, 318/364, 365, 366
See application file for complete search history.

(56) References Cited

U.S. PATENT DOCUMENTS

| | | | | |
|---|---|---|---|---|
| 4,698,622 | A | * | 10/1987 | Goto et al. .................. 340/648 |
| 4,999,551 | A | * | 3/1991 | Yoshida et al. .............. 318/286 |
| 5,512,883 | A | * | 4/1996 | Lane, Jr. ...................... 340/648 |
| 5,831,403 | A | * | 11/1998 | Kanki et al. ................. 318/286 |
| 6,078,263 | A | * | 6/2000 | Galloway, Jr. ............... 340/679 |
| 6,388,412 | B1 | * | 5/2002 | Reed et al. .................. 318/466 |
| 6,445,152 | B1 | | 9/2002 | Calamatas |
| 6,737,823 | B2 | * | 5/2004 | Reed et al. .................. 318/466 |

FOREIGN PATENT DOCUMENTS

| | | |
|---|---|---|
| DE | 1 701 251 | 6/1955 |
| DE | 37 01 251 | 7/1988 |
| DE | 3 814 275 | 12/1988 |
| DE | 4 138 711 | 5/1993 |
| DE | 295 13 962 | 10/1995 |
| DE | 196 45 811 | 6/1998 |
| DE | 198 55 697 | 2/2000 |
| DE | 101 42 431 | 4/2003 |
| EP | 0429835 A1 | 6/1991 |
| EP | 0841743 A2 | 5/1998 |
| FR | 2868112 A1 | 9/2005 |

OTHER PUBLICATIONS

European Search Report; EP 07 11 1601; Jun. 11, 2009; 9 pages.

* cited by examiner

*Primary Examiner*—Walter Benson
*Assistant Examiner*—David S Luo
(74) *Attorney, Agent, or Firm*—St. Onge Steward Johnston & Reens LLC

(57) ABSTRACT

The invention relates to a method for controlled braking of an electrically powered lifting action in the event of a failure, such that at least one of the nominal values for "rotational direction" and/or "operating speed" and/or "door position" and/or "motor capacity" and/or "motor current" is ascertained and compared with an actual value, and such that a motorized braking process or motorized stopping process is triggered by a departure of the actual value from the nominal value that lies outside a predetermined range. In addition the invention relates to a device for applying said method.

13 Claims, 2 Drawing Sheets

METHOD FOR CONTROLLED BRAKING OF A DOOR AND DEVICE FOR APPLYING SAID METHOD

CROSS-REFERENCE TO RELATED APPLICATIONS

The present application claims priority of German patent application No. 10 2006 034 962.8 filed on Jul. 28, 2007, the content of which is incorporated herein by reference.

FIELD OF THE INVENTION

The invention relates to a method for controlled braking of a door and a device for applying said method.

BACKGROUND OF THE INVENTION

The invention relates to a method for controlled braking of a door in the event of a breakdown, that is, in case of a failure of a mechanical component, with the help of the electromotive drive unit of the door.

With electronically powered doors customary today, such as rolling doors, overhead doors, sectional doors, or swinging doors, the door's mechanics are frequently arranged in such a way that the electromotive drive unit of the door is not required to power the full weight of the door. For this purpose the doors, depending on their construction and design, are equipped with various devices such as spring elements, cables, and counterweights, which ensure what only a part of the energy required for motion needs to be directed by means of the electromotive drive, and which can be summarized under the general category of balancing devices.

As soon as a balancing device of this type breaks down, for instance because a spring breaks or a rope connected with the counterweight tears, the result can be an undesired, uncontrolled, and dangerous downward motion, the so-called collapse, of a door.

Doors known in the art, the construction and power unit are designed in such a way that a balancing device can be dispensed with. With these doors, an additional electromechanical braking device frequently ensures that the door is held in the resting position after the power is switched off. With a malfunctioning of the braking device, for instance through eroded brake pads, with these doors as well the result can be a crash of the door.

Combinations of balancing device and electromechanical braking devices are also known in the art. Here the electromechanical braking device, for instance, has the task of rapidly bringing to a standstill a door that is in motion, for instance in case a holding point is reached, and of holding the door securely in this position until such time as another drive command is executed.

In the case of a defect in the braking device, a door in some cases cannot reach the desired holding position or the holding position is not held as long as desired, but instead the door slowly and unintentionally starts to leave the position.

To prevent a collapse of the door, various mechanical solutions are known in the art, such as those described in DE 37 01 251 C2, DE 38 14 275 C2, DE 41 38 711 C2, or DE 198 55 697 C2, and in which, for instance by means of pre-tensioned springs or centrifugally activated mechanical devices, additional braking devices are triggered or actuated, which more or less brake the door, for instance in the lateral tracks of the door, or which act mechanically on the door shaft in order to stop the uncontrolled motion of the door.

All technological solutions known in the art for preventing a door collapse for emergency braking have the disadvantage that additional mechanical devices are required whose functionality in most cases can only be tested with great difficulty during a normal life cycle of a door, and in which, in case of an intentional or unintentional triggering, can only be recognized with difficulty, the reason of the triggering of the device. With a few devices known in the art, in addition, it is impossible to recognize that they are in the triggered state, so that the user of the door facility can recognize the supposed cause of failure only after extensive searching.

The electrical power units for doors in common use today, the so-called door drivers, consist as a rule of an electric motor, which most often takes the form of a reasonably priced asynchronous AC induction motor, and which in most cases is directly connected with a flange-mounted gearbox, whereas the gearbox often takes the form of a so-called worm gear.

It is also customary in the art to feed door drive motors by a frequency converter, so that the door can be operated with different speeds and in order to maintain the possibility for gentle actuation and stopping of the door.

The frequency converter in this case, according to the state of the art, is a component of a complex door controller, which, besides comprising the frequency converter, also has at least one device with which the position of the door can be continuously ascertained. In patents DE 295 13 962 U1 and DE 101 42 431 B4, door controllers of this type, with integrated frequency converter and connected position sensors, are described.

Also reported in the art (DE 196 45 811 C2) is a control device for emergency switch-off. This control device from the art comprises a lifting tool. In lift operation this is intended to avoid any excess load on the lift machinery in the event of a breakdown, for instance from the load being caught. For this purpose any exceeding of a boundary value in the lift process is captured. This device from the art has the disadvantage that an additional capturing device for the mechanical excess load must be provided; for instance, a cable tension sensor is provided in the form of a load cell.

The technical problem that underlies the invention consists in providing a method by which the collapse of a door can be prevented without requiring additional devices on the door or the door driver that can be produced therefore with the devices door driver, door controller, frequency converter, and position sensor that are already available in the art. In addition the invention aims to provide a method that can, at least temporarily, assume the functioning for a defective electrical braking device of the door, and that reliably allows the signaling of a defective balance and/or braking device. In addition, a method is provided for applying the method.

SUMMARY OF THE INVENTION

This technical problem is solved by means of a method with the characteristics according to Claim 1 as well as by a device with the characteristics according to Claim 8.

The inventive method for safe braking of an electrically powered door in the event of a defect is characterized in that at least one nominal value for the "rotational direction" and/or "operating speed" and/or "door position" is ascertained and is compared with the actual value for "rotational direction", "operating speed", and/or "door position" by at least one position sensor; that in the event of a departure of the actual value from the nominal value lying outside a predetermined area, a motorized braking process or a motorized stopping process is triggered; and that the comparison between nominal and actual value is permanently carried out.

The particular advantage of the invention is that the actual values for "rotational direction", "operating speed", and/or "door position" are ascertained on the basis of the data from at least one position sensor. This has the advantage that the position sensor or sensors that are present in any case transmit the actual values to the control device and thus the actual values are available for comparison with the nominal values.

Door hanging. In addition, however, even with the door at resting position, the at least one nominal value is ascertained and is monitored with the nominal value. In this case it is possible to monitor that an electrical braking device for instance has a defect and the door is not in the predetermined resting position. It is also possible to recognize a defective balancing device, which is intended to hold the door in the respective resting position.

An additional advantage of the invention lies in the fact that in the event of a defect, a braking process or stopping process is triggered which primarily or especially preferably is conducted exclusively by the motor.

This means that according to the inventive method, the cited nominal values are captured individually or in combination. These values are compared with the respective actual values. If one or more actual values depart from the nominal values, that is, in such a way that the differences lie outside a predetermined range, a motorized braking process or a motorized stopping process is triggered.

For instance, in relation to the speed of the door hanging, it is possible to determine that the cable of the counterweight has been torn. The door hanging in this case moves with an essentially greater speed than would be the case with a normal opening or closing process. In this case the actual "speed" value differs from the nominal value, and a motorized braking or motorized stopping process is triggered.

The process is thus essentially configured in such a way that it is possible in case of a defect to brake at any time by means of the constant monitoring of the actual value.

The control device, which conducts the comparison between the actual and nominal values, is the control device that is present in the door controller in any case. The control device thus takes over a great range of tasks. The control device processes the input signals. This means that it processes opening and closing orders to the door controller. The control device gives output signals, for instance warning signals. The control device gives the voltage input for the frequency converter. The control device according to the invention processes the signals from the at least one position sensor. The control device in addition can determine the motor current and/or the motor power. For this purpose it has the advantage of measuring devices.

According to another advantageous embodiment of the invention, in the braking or stopping process a voltage input of 0 Hertz (Hz) is entered in a frequency converter. An asynchronous AC induction motor is fed with this direct current, so that the stopping process is triggered by an electromotive braking. It is also possible to set the frequency input in a range of up to 20 Hertz (Hz) in order to move the asynchronous AC induction motor in slow travel mode and to slow down the door motion to such an extent that any endangerment by the moving door is minimized.

Another advantageous embodiment of the invention foresees that in a braking or stopping process an electromechanical braking device is powered parallel to the electromotive braking, if said device is already present. This has the advantage that the door driver and the frequency converter are not required to exert the full braking capacity and thus can be set up for a lower capacity. In addition, as a result, the safety of the process is increased.

An additional advantageous embodiment of the invention foresees that after a braking or stopping process the door is moved into a safe stopping position. As a result the safety of the entire process is increased.

The process of the door operates advantageously through a frequency input of the control device to the frequency converter. The result is that no additional device is required to trigger the braking process.

According to an additional advantageous embodiment of the invention the control device executes a signaling process during and/or after the triggering of the braking or stopping process. The signaling can consist, for instance, of an acoustical and/or optical warning signal.

The inventive device for applying the method according to Claim 1 is distinguished in that the device comprises a control device that is configured as a control device that conducts a comparison of nominal and actual values, and that is configured as a control device that gives a frequency input to a frequency converter.

The control device compares the actual and nominal values. If the actual value differs from the nominal values and if the difference lies outside a predetermined range, then the control device gives a frequency converter a frequency input of 0 Hertz (Hz) for instance, so that a stopping process is triggered.

The inventive device has the further advantage of including an indicator module to indicate a defect so that such a defect can be perceived.

According to a particularly preferred embodiment of the invention, the indicator module is integrated in the control device.

As an additional advantage, at least one electromechanical braking device is provided. This has the advantage of holding the door in an end position and, according to the closed circuit principle, is intended advantageously to exert the braking effect on the motor in support.

Thus the present invention also fulfills the directives and technical rules that are in effect and that rule out any danger arising in a door installation when a simple error occurs.

This objective is achieved in that the components door driver, door controller with frequency converter and position sensor for continual position indication according to the state of the art are here combined. Whereas the frequency converter must not necessary a component that is integrated in the door controller, but rather can also be produced as a more or less separate unit that, however, can be controlled by the door controller unit.

The present invention thus makes use of the fact that, with the corresponding design, it is also possible to output an alliterating current with a frequency of 0 Hertz (Hz)—that is, a direct current—by means of a frequency converter. Feeding an asynchronous AC induction motor with a direct current has the result that this motor remains stuck almost at rest with a very low speed, which in turn allows the connected door to be kept nearly in an instantaneous position.

With the inventive method, which is integrated into the logical flows of the control device of the door controller as a software or firmware, there is a continual control with respect to the instantaneous position of the door and/or whether a motion command should be exerted to move the door and at what speed and in which direction the door is to move.

Door and the actual motion direction and speed of the door ascertained by the position sensor, whereas the terms nominal motion direction and nominal speed also include the resting position, the control device triggers the forced braking of the door, by transmitting to the frequency converter a frequency input of 0 Hertz to 20 Hertz (Hz) in order to halt the door motion or at least to reduce it drastically.

Door motion can thereby be halted for an extended period or merely temporarily stopped or drastically reduced, is independent of the inventive method here, but rather depends on the electrical and mechanical capacity of the door driver and of the frequency converter and of the electromechanical braking device that may also be present.

In an additional advantageous embodiment, the inventive control device, after the detection of a previously described condition, can also transmit a frequency input to the frequency converter with which the door, moving slowly, can move to a safe holding position such as the closed position. This process then ensures that no additional danger can result from the supposedly defective door installation, which consists of door, door power unit, and door controller.

In another advantageous embodiment the inventive control device causes the signaling of the recognized defect, so that outside persons can be made aware of the defect and a prompt error search and error correction can be set in motion.

Additional characteristics and advantages of the invention can be seen from the appended illustration, in which several embodiments of an inventive door controller for safe braking of a door are depicted in merely exemplary form.

DETAILED DESCRIPTION OF THE INVENTION

Figure 1:
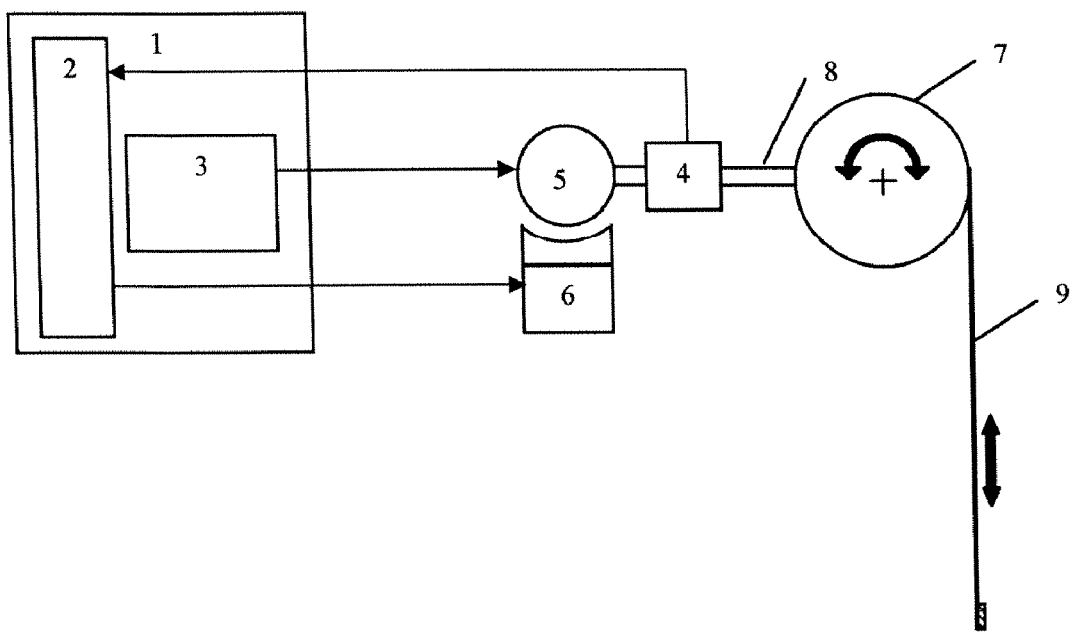
FIG. 1 shows a schematic view of a door installation with a rolling door and an electromechanical brake.

A door controller 1, which includes a frequency converter 3 and a control device 2, is depicted in FIG. 1. In normal operation the frequency converter 3 receives from the control device 2 an input for the frequency and rotational direction that are to be outputted and with which an electrical power unit 5 can be fed, which is mechanically connected with a door shaft 7 by means of a driveshaft 8 and on this path can set a door hanging 9 in motion.

The control device 2 can constantly be informed of the actual position and speed of the door power unit 5 and of the door hanging 9 that is mechanically coupled with it by means of a position sensor 4, which can be positioned between the electrical power unit 5 and the door shaft 7 or on or at the door shaft 7 or can be integrated in the electrical power unit 5 or positioned at another point, and which can take the form of an absolute value indicator or an incremental indicator.

The inventive control device 2 is a component of the door controller 1 and is depicted only in schematic form, because it is combined as a software module in the logical pathways.

The control device 2 in any case is contained in the door controller 1 and according to the invention only assumes additional tasks.

The inventive control device 2 processes the current nominal values for "rotational direction" and "travel speed" that are present internally and compares them with the actual values of the data provided by the position sensor 4, from which the rotational direction and the momentary speed of the gate power unit, in addition to the instantaneous door position, can be ascertained.

Device 2 detects a difference that lies outside a previously defined range, then the control device 2 operates the frequency converter 3 and gives the frequency converter 3 a frequency input of 0 Hertz (Hz) in order to drastically reduce the speed of the electrical power unit 5 or to bring it to a stop. At the same time the inventive control device 2 operates a braking device 6 so that this device can support the braking process. This braking device 6 is configured as an electromechanical braking device.

In the embodiment of the door installation depicted in FIG. 1, the inventive method can also be applied to monitor the functioning of the power unit 5. In the event that the power unit 5, for instance because of mechanical ware of the door hanging 9, cannot be moved or held in the required manner, at any time the braking device 6 can be powered by the inventive control device 2 in order to brake the door hanging 9.

Figure 2:
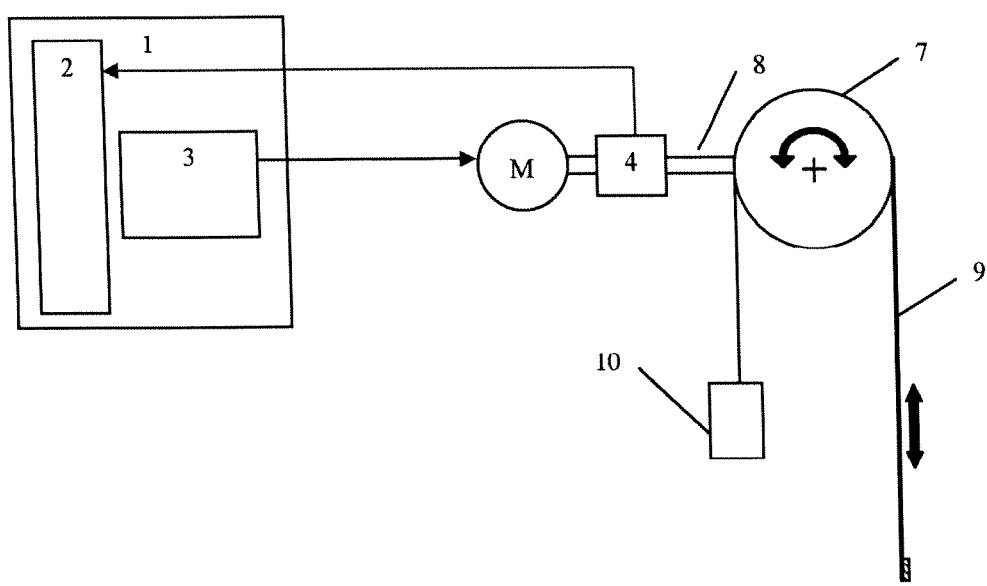
FIG. 2 shows a schematic view of a door installation with a balancing device.

In the door installation shown in FIG. 2, we see a balanced door installation in which a balancing device 10 is configured as a counterweight, which is suspended by a cable and whose mass corresponds approximately to the mass of the door hanging 9. In the event that the balancing device 10 should be defective, for instance because of a worm cable, the door hanging 9 would move downward more or less unbraked.

In comparing the nominal values with the actual values, if the control device 2 detects an unintended motion of the door, which lies outside a previously defined range, the control device 2 gives the frequency converter 3 a frequency input of 0 Hertz (Hz) in order to drastically reduce or bring to a standstill the speed of the electrical power unit 5.

The electrical power unit is not of such dimension, as a rule, that it can hold the full load of a defective door mechanism. Thus in an advantageous embodiment it is foreseen that the control device 2, after detecting a defect, moves the door in slow motion into a safe resting position, which for instance can be the closed position of the door, which depends on the type of door, but can also be a different position.

The invention claimed is:

1. A method for safe braking of an electrically powered door in the event of a defect, characterized in that at least one nominal value for "rotational direction" and/or "travel speed" and/or "door position" is ascertained and is compared with an actual value; that the actual values for "rotational direction", "travel speed", and/or "door position" are ascertained by at least one position sensor; that in the event of a difference between the actual value and the nominal value that lies outside a predetermined range, a motorized braking process or a motorized stopping process is triggered; and that the comparison between nominal and actual value is permanently carried out; wherein the door is brought into a safe holding position after a braking or stopping process.

2. A method according to claim 1, characterized in that in the braking or stopping process a frequency input of 0 Hertz to 20 Hertz (Hz) is predetermined in a frequency converter and that with this direct current an electrical power unit is fed which contains an asynchronous AC induction motor.

3. A method according to claim 1, characterized in that in a braking or stopping process an electromechanical braking device is actuated.

4. A method according to claim 1, characterized in that the motion of the door occurs by means of a frequency input from a control device to the frequency converter.

5. A method according to claim 1, characterized in that the control device executes a signaling process during and/or after the triggering of the braking or stopping process.

6. A method according to claim 1, characterized in that the control device triggers a braking or stopping process during a start and/or stop ramp.

7. A device according to claim 6, characterized in that the device comprises an indicator module for indicating a defect.

8. A device according to claim 7, characterized in that the indicator module is integrated in the control device.

9. A device according to claim 7, characterized in that an electrical braking device is provided.

10. A device for applying the method according to claim 1, characterized in that the device comprises a control device that is configured as a control device that executes a comparison of nominal and actual value, and that is configured as a control device that gives a frequency input to a frequency converter.

11. A device according to claim 10, characterized in that the indicator module is integrated in the control device.

12. A device according to claim 11, characterized in that an electrical braking device is provided.

13. A device according to claim 10, characterized in that an electrical braking device is provided.

* * * * *